United States Patent [19]

Taylor

[11] Patent Number: 5,092,268

[45] Date of Patent: Mar. 3, 1992

[54] HABITAT FOR RAISING AQUATIC LIFE

[76] Inventor: Vanus L. Taylor, P.O. Box 135, Salem, Ala. 36874

[21] Appl. No.: 621,038

[22] Filed: Dec. 3, 1990

[51] Int. Cl.$^5$ .............................................. A01K 61/00
[52] U.S. Cl. .................................................. 119/3; 261/81
[58] Field of Search ..................... 119/2, 3; 261/81, 82

[56] References Cited

U.S. PATENT DOCUMENTS

| | | | |
|---|---|---|---|
| 3,488,039 | 1/1970 | Ekman | 261/81 |
| 3,747,904 | 7/1973 | Gross | 119/3 X |
| 4,273,732 | 6/1981 | Roediger | 261/DIG. 47 X |
| 4,961,400 | 10/1990 | Capray | 119/3 |

Primary Examiner—Gene Mancene
Assistant Examiner—Thomas Price

[57] ABSTRACT

A habitat for raising aquatic life such as fish, monitors the temperature and the dissolved oxygen content of the water therein and introduces water from the epilimnion to increase the dissolved oxygen content and the temperature. The habitat is air powered by a low pressure air source which releases air into the habitat to move water during a cyclic operation of a ram-like member. An alternative embodiment can draw cool water from the hypolimnion to mix with warm oxygen-laden epilimnion water, and an embodiment powered by wave action in the open sea is disclosed.

18 Claims, 4 Drawing Sheets

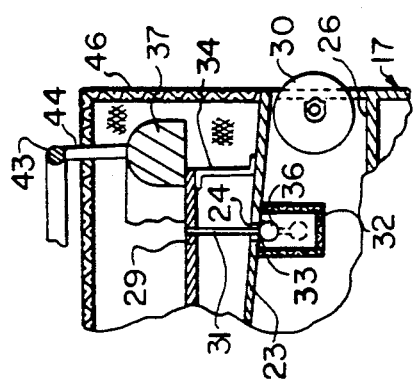
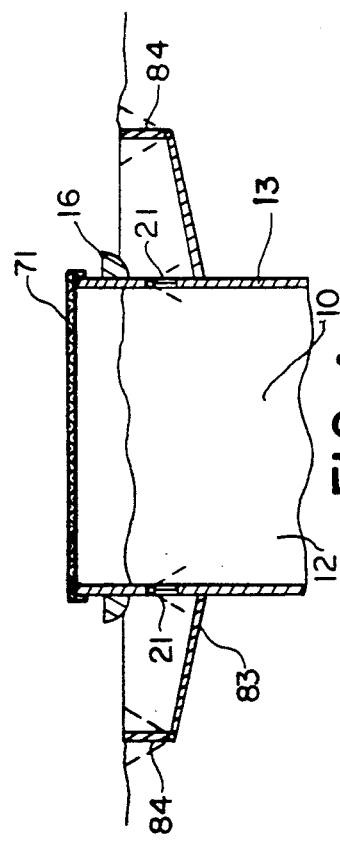
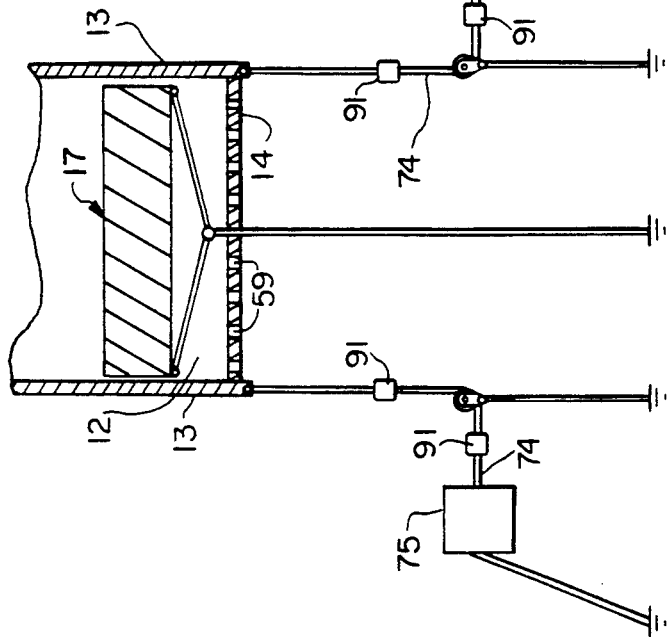

HABITAT FOR RAISING AQUATIC LIFE

FIELD OF THE INVENTION

The present invention relates to aquatic farming and more particularly, to raising aquatic life in a controlled temperature and dissolved oxygen environment. Even more particularly, the present invention relates to a habitat for raising aquatic life wherein the dissolved oxygen content and temperature are regulated by selective intake and discharge of water between the habitat and a surrounding body of water. In even greater particularity, the present invention may be described as a containment habitat for aquatic life wherein a reciprocating ram-like member forces water into and out of the habitat to assure an optimum temperature and dissolved oxygen content therewithin.

BACKGROUND OF THE INVENTION

Aquatic farming has long recognized the importance of the water quality in raising aquatic life such as fish. Among the variables associated with water quality as it relates to the survival, growth, and management of fish are temperature and dissolved oxygen content. These two interrelated variables may, independently or in combination, result in fish kills or damage to the organism in a very short time period, therefore aquatic farming has heretofore been a labor intensive undertaking due to the obvious requirement that these conditions be closely monitored and controlled where possible.

In as much as bodies of water are generally heated from the surface, the surface waters heat faster than the lower waters with a marked decrease in density as the temperature rises such that the surface waters can become so warm and light that they do not mix with the cooler, heavier water in lower layers. This phenomenon, known as thermal stratification, yields an upper layer of warm water, the epilimnion, a lower, cooler layer known as the hypolimnion, and a layer having a rapidly changing temperature between the epilimnion and the hypolimnion. Warm water fish grow best at temperatures between 25° and 32° C., but are intolerant to rapid temperature changes even within this range, thus if the epilimnion becomes overheated, fish seeking relief in the hypolimnion may be subject to stress as they encounter the temperature changes.

Dissolved oxygen is probably the most critical variable. The solubility of dissolved oxygen is inversely variable with the temperature and diffusion is quite slow, therefore photosynthesis by phytoplankton is the primary source of oxygen in the system and light is often the primary factor regulating photosynthesis by phytoplankton. Light rapidly decreases in intensity as it passes through water, consequently the rate of oxygen production by phytoplankton decreases with depth and, below a certain depth, no more oxygen is produced. Since oxygen is constantly used by the aqualife and since oxygen is only produced by photosynthesis during daylight, there is a depth in stratified ponds where the water will contain no dissolved oxygen. The stratification of dissolved oxygen usually corresponds closely to thermal stratification with the epilimnion containing dissolved oxygen and the hypolimnion being depleted of dissolved oxygen.

Representative of the prior art known to me as having attempted to deal with the problems of water quality management are U.S. Pat. No. 3,698,359 to Fremont and U.S. Pat. No. 4,516,528 to Jones. Fremont teaches a large floating enclosure formed by a closed membrane within which water quality is controlled by pumping in oxygenated and treated water. Displaced water exits via gutters at the periphery of the enclosure. Jones teaches an elaborate aeration raceway system.

Of course, numerous pumps, sprayers, and paddlewheel aerators have also been used in aquatic farming, however these are often time and labor intensive.

SUMMARY OF THE INVENTION

It is the object of my invention to provide a habitat within which aquatic life may be raised in an optimum temperature and dissolved oxygen environment.

Another object of my invention is to provide a habitat in which aquatic life can be raised to a desired size and harvested with very little labor expenditure for maintenance or harvesting.

Yet another object of my invention is to provide a habitat which may be secured during inclement weather without adversely affecting the aquatic life contained therein.

These and other objects of my invention are advantageously accomplished by a unique structure which contains the aquatic life to be cultivated and which takes maximum advantage of the stratification of the body of water surrounding the structure to maintain the desired conditions by selectively flowing water between the containment structure and the surrounding body of water. More specifically, I utilize a containment chamber extending from the surface of the water downwardly beneath the thermocline. Preferably, the chamber is insulated so that the varied water temperatures are not conducted through the walls of the structure. The containment chamber is buoyant and is anchored to the bottom of the body of water such that it constantly floats at a fixed reference relative to the surface of the water. Inside the containment chamber is a ram-like member which moves vertically relative to the containment chamber. Appropriately spaced directional gates are formed in the containment chamber to allow water to be drawn into or discharged from the containment chamber responsive to the relative motion of the ram-like member. The ram-like member is preferentially powered by a low pressure air supply, which further functions as a source of aeration for the water within the containment chamber. The rate at which the ram-like member reciprocates is determined by the dissolved oxygen content and temperature of the water within the containment chamber. Alternately, the relative motion of the ram-like member and the containment chamber may be induced by wave action of the body of water.

BRIEF DESCRIPTION OF THE DRAWINGS

Apparatus embodying features of my invention are illustrated in the appended drawings which form a portion of this application and wherein:

FIG. 3 is an enlarged, partial perspective view of one side of the ram-like member;

FIG. 4 is a fragmental sectional view of the upper portion of the embodiment shown in FIG. 1 showing a solar collector in use;

FIG. 5 is a partial sectional view of a third embodiment wherein relative motion of the ram-like member is induced by wave action.

DESCRIPTION OF A PREFERRED EMBODIMENT

Figure 1:
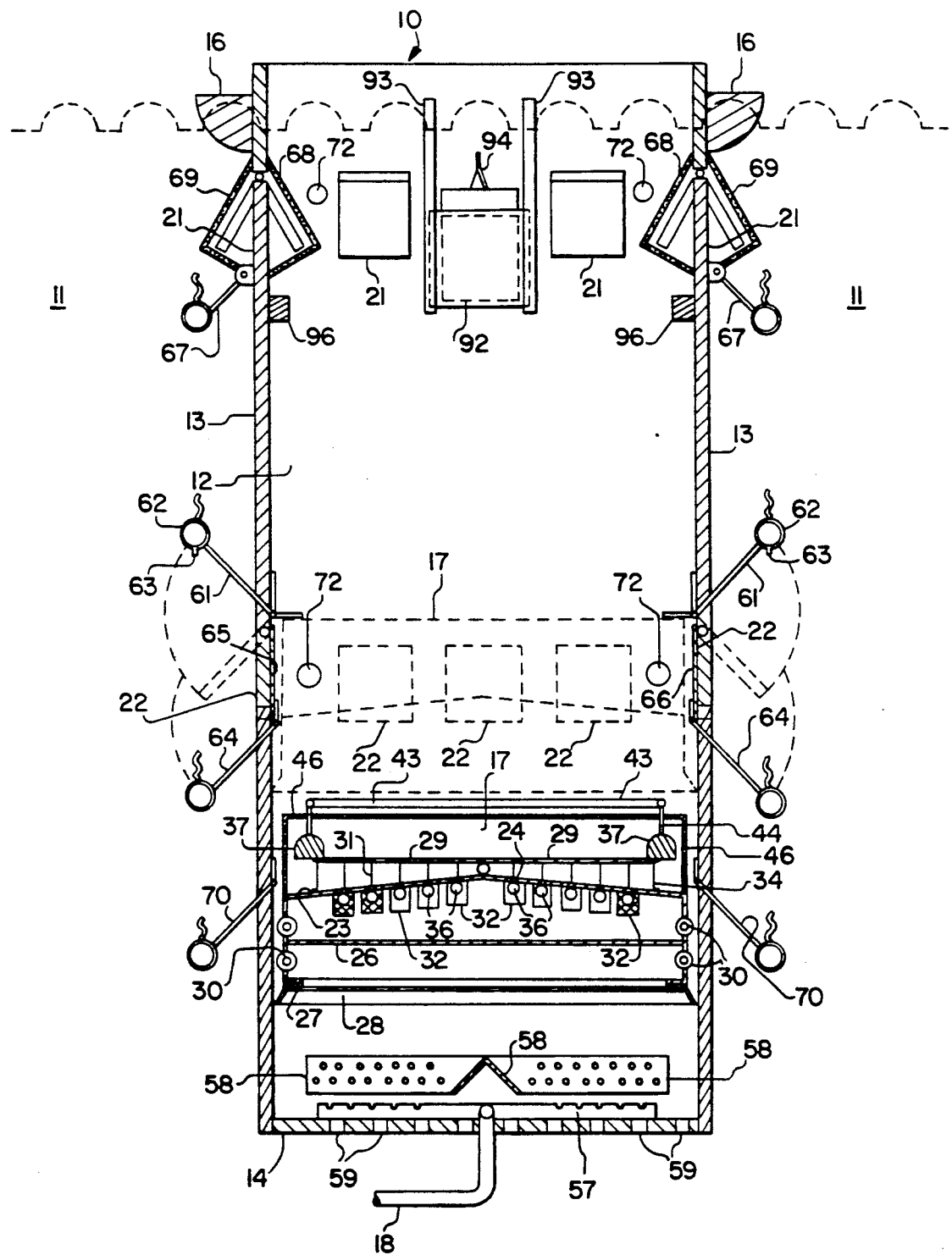
FIG. 1 is a vertical sectional view taken along the center line of the apparatus.

Referring to FIG. 1, it may be seen that my apparatus, hereinafter referred to as the habitat 10, is supported in a surrounding body of water 11. The habitat 10 is depicted herein as being substantially cylindrical, however it may be advantageous to form the habitat with a different cross-sectional shape such as pentagonal column or octagonal column. The habitat 10 includes a containment chamber 12 formed by upstanding side walls 13 which extend from the surface of the water to beneath the thermocline and a bottom member 14. A variety of materials may be used to fashion the habitat 10, however it is expected that the side walls 13 at least will be made from a buoyant, thermally insulative material such that the habitat 10 is generally buoyant. A collar 16 which may also serve as a catwalk encircles the upper portion of the containment chamber 12 at the water line and assists in stabilizing the habitat 10. The habitat 10 is anchored to the bottom of the body of water as shown in FIG. 2 and as will be discussed hereafter.

Slidably mounted within the containment chamber 12 and covering substantially the same cross-sectional area as the interior thereof is a ram-like member 17.

Figure 2:
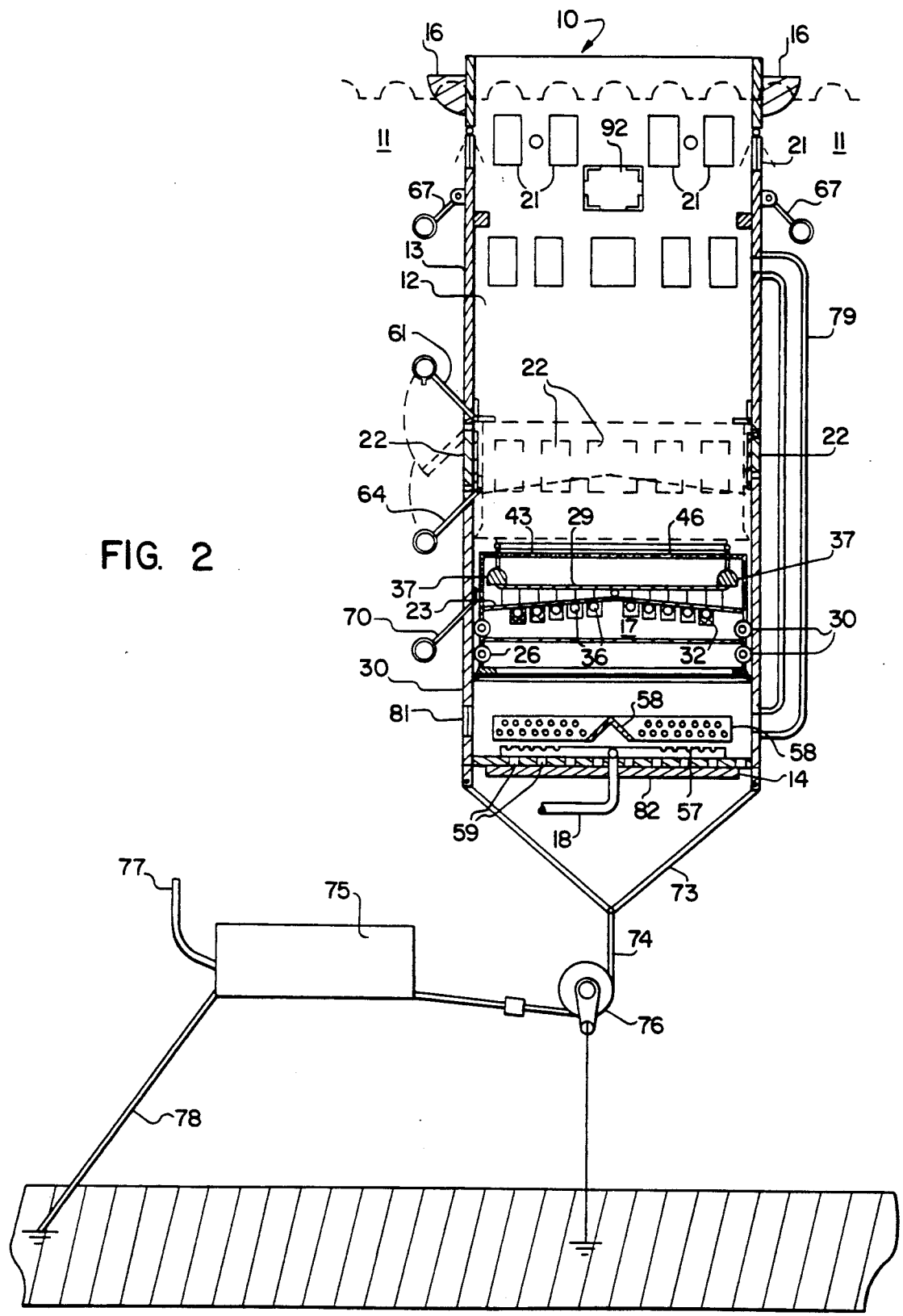
FIG. 2 is also a vertical sectional view of a second embodiment showing one method of anchoring the apparatus.
Figure 6:
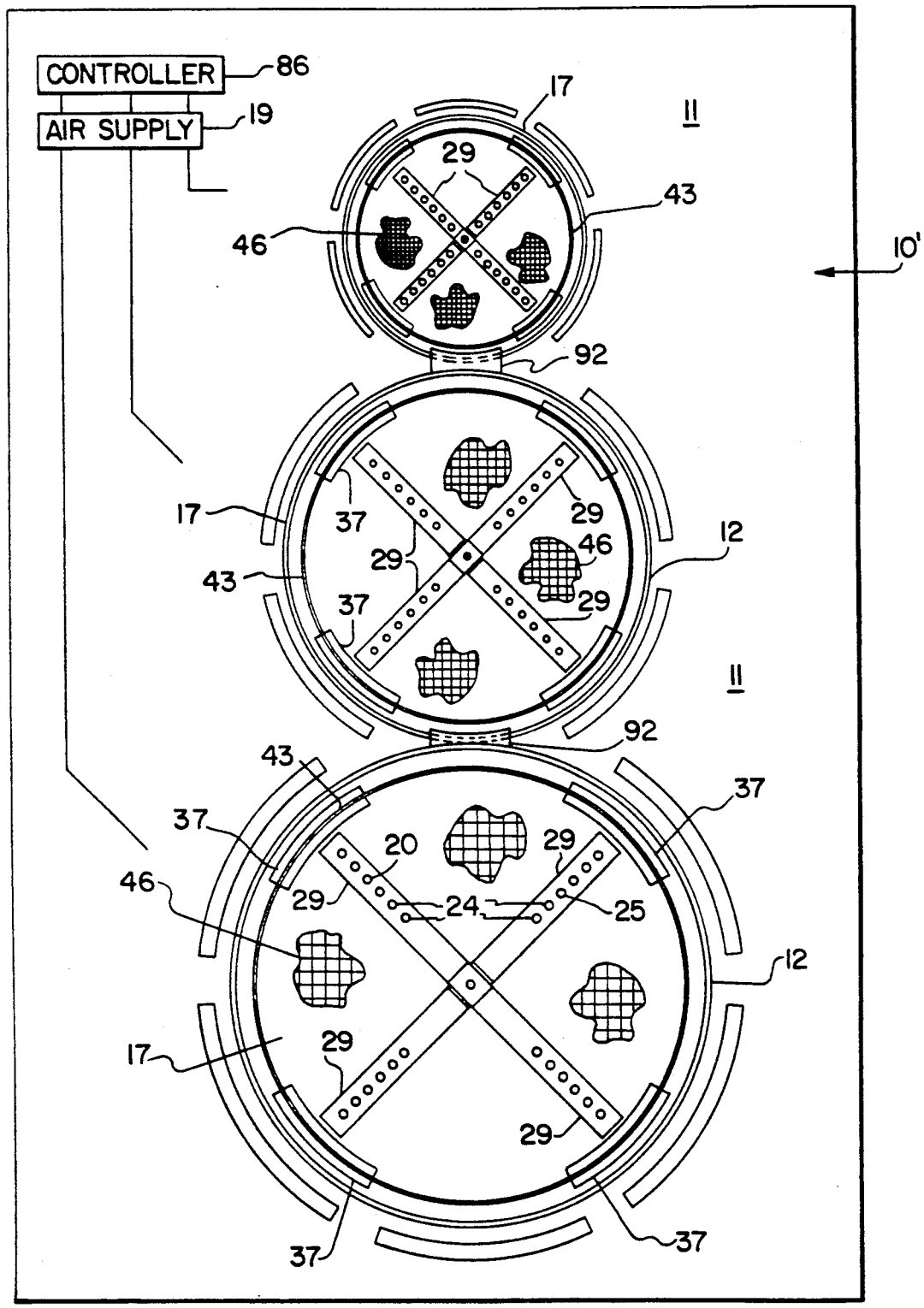
FIG. 6 is a top plan view showing several containment chambers connected to provide a staged habitat.

In the embodiment shown in FIGS. 1 and 2, the ram-like member 17 is powered by low pressure air introduced therebeneath via a line 18 from a remote blower or other air source 19, as shown in FIG. 6. The side walls 13 are provided with a plurality of directional gates 21 and 22 located in the epilimnion and the hypolimnion respectively. The ram-like member 17 includes a cap member 23 which has a peaked top, such that in the embodiment depicted the top forms a cone, and depending sides. The top of the cap member 23 has a plurality of circular apertures 24 therethrough forming a row of apertures 24 along a diameter of the cap member and a second row along a second diameter offset by a predetermined angular measure such as 90°. The sides of the cap member 23 also have inwardly facing baffles 26 and 27 and support a resilient skirt 28 which contacts the interior of the containment chamber and carry a set of guide rollers which prevent binding as the ram-like member 17 reciprocates. The skirt 28 prevents major water flow around the cap member 23.

Pivotally mounted to the center of the cap member 23 are a set of stiff arm members 29 which extend over the rows. Each arm member 29 carries a plurality of plungers 31 which are aligned with the apertures 24 and are caused to move vertically with respect to the apertures by pivotal motion of the arm member 29. Each arm member 29 has a restraint 34 to limit the upward motion thereof. Each aperture 24 has associated therewith, a screen-like cage 32 which depends beneath the cap member 23. Within the cage 32 is a buoyant ball 36 which is free to move vertically within the cage 32 beneath the aperture 24. The ball 36 is larger in diameter than the aperture 24 and cannot exit therethrough. Each aperture 24 is defined by an O-ring 33 against which the buoyant ball 36 may be seated when supported by water beneath the cap member.

Each arm 29 has formed at its outermost end a float 37 which lifts the arm 29 to the extent allowed by restraint 34 such that the plungers 31 are not urging the balls 36 away from the O-rings 33. The float 37 is connected to a buoyant actuator ring 43 by an extension 44 which passes through a cover screen 46. An aeration tee 57 is located in the bottom of chamber 12 and connected to air line 18. Diffuser screens 58 are placed above the tee 57 to disrupt the larger air bubbles given off by the tee. A plurality of apertures 59 in the bottom 14 of the containment chamber allow water to pass therethrough.

A set of pivotally mounted control arms 61 are mounted at a second predetermined position above the rest position or first predetermined position of the ram-like member 17. These control arms 61 include a length of tubing 62 which may be selectively filled with air from air source 19. When air is removed therefrom, the tubing 62 is filled with water via apertures 63. Thus the control arms 61 may pivot up or down as desired. When the tube 62 is filled with air, the control arms 61 extend into the containment chamber to engage actuator ring 43. A second set of control arms 64 operate in the same manner as arms 61 to prevent inward motion of the gates 22 and an associated screen 66.

Upper gates 21 are normally prevented from opening outwardly by control arms 67 which operate in the same manner as control arms 61 and 64. Gates 21 have associated therewith an inner and outer screen 68 and 69. The top of the containment chamber 12 is closed by a screen 71, as shown in FIG. 4. A plurality of diffused oxygen and/or temperature sensors 72 are located within the containment chamber to monitor the water quality.

Another set of control arms 70, operable in the same manner, are positioned near the bottom of the chamber to selectively arrest movement of the ram-like member 17 such as when medication is introduced into the system.

Referring to FIG. 2, the habitat 10 is anchored to the bottom of the body of water by a buoyancy balancing system. A tie down yoke 73 is connected to the bottom of the habitat 10 and to a flexible connector 74 which passes through a sheave 76 anchored to the bottom of the body of water. The connector 74 is connected to a float 75 which may be filled with air from air supply 19 via a manually activated line 77. The float 75 is anchored to the bottom by a second flexible connector 78 such that the float 75 may rise and fall as the water level changes to keep connector 74 taut.

FIG. 2 also shows a second embodiment, for use where the water temperature may exceed 32°, which provides an external conduit 79 connected between the upper and lower portion of the habitat 10. A one-way gate 81 admits cool water beneath the ram-like member 17. The apertures 59 may be closed by rotating a closure plate 82 such that the apertures therein are misaligned with apertures 59.

A third embodiment is shown in FIG. 4 wherein a solar collector 83 is attached to the upper portion of the side walls 13. Buoyant gates 84 pivot adjacent the surface of the water to allow the warmest uppermost portion of the water to be drawn into the enclosure formed by the solar collector where the water is warmed prior to entering the habitat 10.

Each of the above embodiments operate in substantially the same manner. The habitat 10 is positioned in the body of water as desired and anchored via float 75 such that the habitat 10 extends from the surface of the water to beneath the thermocline. The water temperature and dissolved oxygen content are monitored by the sensors 72 which output their signals to a controller 86 which may be a simple electronic or electromechanical device adapted to regulate the volume of air introduced by air supply 19, as is well known in the art.

Air from the air supply passes through air line 18 to the aeration tee 57. With the ram-like member 17 at the first predetermined position, the aeration tee 57 then releases air beneath the diffuser screen 58, which allows the air to bubble up beneath the cap member 23. Since the apertures 24 are sealed by the balls 36, the air collects beneath the cap member 23 and displaces water therebeneath until the upward buoyant force overcomes the weight of the cap member 23.

When the buoyant force of the air overcomes the weight, the ram-like member 17 rises toward the surface, necessitating removal of some of the water in the habitat 10. Since the upper gates 21 are held against outward movement, the major flow of the water is discharged through the lower gates 22. As the ram-like member 17 rises to a second predetermined position, the actuator ring 43 contacts the control arms 61, displacing the arms 29 downwardly relative to the cap member. The balls 36 are pushed from registry with the apertures 24 by the plungers and the air is released from beneath the cap member 23. The ram-like member 17 then sinks to the first predetermined position in engagement with the aeration tee 57, thereby drawing water into the habitat 10 through the upper gates 21. The water drawn in through the upper gates is from the warmer oxygen-laden epilimnion, thus replenishing the oxygen supply within the habitat 10. It should be understood that the preceeding cycle is repeated continuously at a rate determined by the rate of accumulation of air beneath the cap member 23, consequently at a rate determined by the air flow from air supply 19 which in turn is regulated by the controller in accordance with the temperature and dissolved oxygen content sensed by sensors 72. Since the side walls 13 of the habitat are insulated, heat transfer therethrough is minimized so that the temperature of the water within the habitat is substantially a function of the temperature of the water drawn in through the gates 21.

It may be seen that in colder climates, the solar collector 83 shown in FIG. 4 may be needed to warm the intake water to maintain the optimum temperature, while in a very hot region, the embodiment of FIG. 2 may be needed. In this embodiment, the ram-like member 17 works in substantially the same manner, however, as the buoyant air-laden ram ascends, cooler water from the hypolimnion is drawn in through gate 81. When the trapped air beneath the cap member 23 is released, this water is forced through the conduit 79 to mix with the water drawn in through gates 21, thus a mix of oxygen-laden overheated water and oxygen-depleted cool water is introduced to the containment chamber during each cycle.

Another embodiment is shown in FIG. 5, wherein the ram-like member 17 is not air driven but rather is stationary. The cycle is driven by wave action as in the open sea. A plurality of buoyant balance systems are attached to the containment chamber 12 such that the chamber 12 is free to rise and fall with the waves, thus inducing relative reciprocating motion between the ram-like member and the containment chamber such that the water flows through the gates as described above. Of course, limit blocks 91 are placed on the flexible connector 74 to prevent excessive relative motion which might damage the apparatus, and as with the other embodiments, the entire structure may be submerged to weather a storm by simply increasing the buoyancy of the float 75.

A plurality of containment chambers 12 may be linked together to form a staged habitat 10' as shown in FIG. 6. As the aquatic life grows larger, it is moved to a larger chamber to maintain an optimum pounds per acre ratio to enhance growth. Referring to FIGS. 1 or 2, a gate 92 near a third predetermined position links each chamber 12 with the adjacent chamber 12 in the habitat 10'. The gate is slidably mounted in vertical runners 93 and is raised by filling a gate float 94 with air from the air supply 19. With the gate 92 open, the control arms 61 are flooded with water and are moved out of the way of the ram-like member 17 so that it may move upward until it engages stops 96 at the third predetermined position. As the ram-like member moves upward, the aquatic life such as fish are forced to exit through the gate 92. The screen 46 may be appropriately channeled or shaped to insure that all the fish can access the gate 92. When the fish have been moved through the gate 92, the ram-like member 17 can be lowered by manually actuating the actuator ring 43 to release the trapped air. Control arms 61 are reset, the chamber 12 restocked with fish and the cycle is repeated.

The various control arms 61, 64 and 67 allow the operator to induce back flow in the habitat to clean the screens or dislodge debris, however, most waste matter should pass readily through the screens with the discharged water so very little maintenance is required. Of course, the device may be used as an emergency aerator by utilizing the maximum reciprocation rate to disrupt the stratification within a body of water.

From the above, it may be seen that the habitat is a versatile and useful means for raising aquatic life, particularly fish. It automatically provides an optimum water quality in terms of temperature and dissolved oxygen. There is no accumulation of waste material in the habitat 10, the fish are easily harvested through gate 92, and can easily be treated by medication in a defined volume of water. Automated feeders of the type used in the industry may be used to further reduce labor costs, which are minimized by this invention.

While I have shown my invention in various forms, it will be obvious to those skilled in the art that it is not so limited but is susceptible of various changes and modifications without departing from the spirit thereof.

What I claim is:

1. Apparatus for raising aquatic life, and said apparatus positioned in a controlled oxygen and temperature environment within a surrounding body of water, comprising:
   (a) an imperforate containment chamber with depending side walls extending from the surface of the water downward to an elevation below the thermocline;
   (b) ram means positioned within said containment chamber and adapted for reciprocatory motion relative to said containment chamber selectively to a first predetermined position and a second predetermined position or a third predetermined position within said containment chamber;
   (c) means for imparting relative motion between said chamber and said ram means;

(d) gate means located proximal said second predetermined position and said third predetermined position for passing water between said containment chamber and said surrounding body of water responsive to the position of said ram means.

2. Apparatus as defined in claim 1 further comprising means for aerating water within said containment chamber 3. Apparatus as defined in claim 1 wherein said ram means and said containment chamber have minimal clearance therebetween such that during relative movement therebetween, minor water flow occurs between a periphery of said ram means and an interior surface of said containment chamber and major water flow is induced through said gate means.

4. Apparatus as defined in claim 1 wherein said ram means comprises:
   (a) a cap member having a peaked top sloping downwardly and outwardly from a center thereof extending substantially over an area within said containment chamber and said depending side walls, said top having a plurality of apertures therethrough;
   (b) at least one arm member pivotally mounted to said cap member at the peaked top thereof and extending outwardly to the periphery of said cap member with said arm member having a plurality of depending plungers attached thereto in alignment with said apertures and a means for providing buoyancy attached thereto distal said peaked top; and
   (c) a plurality of buoyant members located subjacent said cap member, each having a transverse dimension greater than the transverse dimension of said apertures in said cap member, and each being associated with a particular aperture.

5. Apparatus as defined in claim 4 wherein said means for imparting relative motion said ram means comprises an air line disposed within said containment chamber beneath said cap member to introduce air from a remote source.

6. Apparatus as defined in claim 5 further comprising stop members located at said second predetermined position to engage said buoyancy providing means to open said apertures.

7. Apparatus as defined in claim 1 wherein said ram means comprises:
   (a) a cap member extending substantially coextensive of a transverse area within said containment chamber and having a negative buoyancy, with said cap member having a plurality of apertures therein; and
   (b) means for closing said plurality of apertures such that air introduced beneath said cap member is retained therein and for opening said plurality of apertures to release said air.

8. Apparatus as defined in claim 7 wherein said means for closing said plurality of apertures comprises:
   (a) at least one arm member having a plurality of depending plungers thereon and affixed to the center of said cap member for limited vertical movement above said cap member and having a means for providing buoyancy attached thereto; and
   (b) a plurality of buoyant members displaced within said cap member, each having a transverse dimension greater than the transverse dimension of said apertures in said cap member.

9. Apparatus as defined in claim 8 further comprising stop members located at said second predetermined position to engage said buoyancy providing means to open said apertures.

10. Apparatus as defined in claim 1 wherein said ram means remains stationary and said means for providing relative motion between said chamber and said ram means is a buoyancy balance system which moves the containment chamber vertically within predetermined limits responsive to wave action in the surrounding body of water.

11. Apparatus as defined in claim 1 further comprising means for introducing cooler water from beneath said thermocline into said containment chamber above said ram means.

12. Apparatus as defined in claim 11 wherein said buoyancy balance system comprises:
   (a) a sheave connected to the bottom of said body of water;
   (b) a flexible connector affixed at one end to the bottom of said containment chamber with the other end passing around said sheave;
   (c) a variable buoyancy float connected to said other end and connected to the bottom of said body of water such that said variable buoyancy float moves in opposition to the water level of said body of water to lengthen or shorten the flexible connector in accordance with the distance between said sheave and the bottom of said containment chamber.

13. Apparatus as defined in claim 1 further comprising:
   (a) conduit means providing a passageway between said containment chamber beneath said ram means and said containment chamber above said ram means for water to pass therethrough externally of said containment chamber; and
   (b) gate means located beneath said ram means for controlling the passage of water between said body of water and said containment chamber.

14. Apparatus as defined in claim 1 further comprising a flexible solar collector mounted about the top of said containment chamber and extending generally radially therefrom, with said solar collector being adapted to receive only an uppermost portion of said body of water for heating by radiant energy absorbed from the sun prior to entry into said containment chamber.

15. Apparatus as defined in claim 1 further comprising:
   (a) a plurality of sensors for detecting the level of oxygen in the water within said containment chamber and the temperature of said water, each having an output; and
   (b) control means responsive to the output of said sensors for regulating the rate at which said means for providing relative motion operates.

16. Apparatus as defined in claim 1 further comprising gate means located proximal said third predetermined position for removing any aqualife from said containment chamber.

17. A method for raising aqualife in a controlled oxygen and temperature environment comprising the steps of:
   (a) placing a vertically oriented containment chamber within a surrounding body of water having a discernible thermocline such that said chamber extends from above the surface of said body of water to beneath said thermocline;
   (b) placing a quantity of aqualife within said containment chamber;

(c) inducing a limited reciprocating motion to a ram-like member mounted within said chamber such that water is selectively discharged from said chamber into said surrounding body of water and drawn into said containment chamber by the action of said ram-like member; and (d) sensing the dissolved oxygen content and temperature of the water within the containment chamber to regulate the rate of reciprocating motion of said ram-like member such that a predetermined oxygen level and temperature are maintained by drawing water into and discharging water from said containment chamber.

18. The method of claim 17 comprising the further step of aerating said water within said containment chamber.

* * * * *